United States Patent
Zhang et al.

(10) Patent No.: US 9,877,297 B2
(45) Date of Patent: Jan. 23, 2018

(54) LOCATING METHOD, USER EQUIPMENT, AND BASE STATION

(71) Applicant: HUAWEI TECHNOLOGIES CO., LTD, Shenzhen (CN)

(72) Inventors: Yajun Zhang, Shenzhen (CN); Yunsheng Kuang, Shenzhen (CN)

(73) Assignee: Huawei Technologies Co., Ltd, Shenzhen (CN)

(*) Notice: Subject to any disclaimer, the term of this patent is extended or adjusted under 35 U.S.C. 154(b) by 0 days.

(21) Appl. No.: 15/321,441

(22) PCT Filed: Jun. 24, 2014

(86) PCT No.: PCT/CN2014/080644
§ 371 (c)(1),
(2) Date: Dec. 22, 2016

(87) PCT Pub. No.: WO2015/196372
PCT Pub. Date: Dec. 30, 2015

(65) Prior Publication Data
US 2017/0150473 A1    May 25, 2017

(51) Int. Cl.
*H04W 24/04* (2009.01)
*H04H 20/38* (2008.01)
*H04W 64/00* (2009.01)
*H04W 4/00* (2009.01)

(52) U.S. Cl.
CPC ............ *H04W 64/00* (2013.01); *H04H 20/38* (2013.01); *H04W 4/008* (2013.01); *H04W 24/04* (2013.01); *H04W 64/003* (2013.01)

(58) Field of Classification Search
CPC .............................. H04W 24/04; H04H 20/38
See application file for complete search history.

(56) References Cited

U.S. PATENT DOCUMENTS

| | | | |
|---|---|---|---|
| 6,091,362 A | 7/2000 | Stilp et al. | |
| 8,811,283 B2* | 8/2014 | Lu | H04L 12/5691 370/310 |
| 8,849,300 B2* | 9/2014 | Zhou | G01S 5/06 455/456.1 |
| 9,668,202 B2* | 5/2017 | Nagasaka | H04W 48/16 |
| 2005/0202832 A1 | 9/2005 | Sudit | |
| 2010/0322258 A1 | 12/2010 | Dynarski et al. | |
| 2011/0319020 A1 | 12/2011 | Desai et al. | |
| 2012/0040694 A1 | 2/2012 | Zhou et al. | |

(Continued)

FOREIGN PATENT DOCUMENTS

| | | |
|---|---|---|
| CN | 101873690 A | 10/2010 |
| CN | 102711036 A | 10/2012 |
| CN | 203225891 U | 10/2013 |

(Continued)

*Primary Examiner* — Asghar Bilgrami
(74) *Attorney, Agent, or Firm* — Slater Matsil, LLP

(57) ABSTRACT

A locating method, user equipment, and a base station are provided. The locating method includes: receiving, by user equipment, a locating broadcast message sent by a base station, where the locating broadcast message carries a locating list, and the locating list includes an identifier of locatable user equipment. If the locating list does not include an identifier of the user equipment, the method includes ignoring a locating signal sent by the base station.

20 Claims, 7 Drawing Sheets

(56) References Cited

U.S. PATENT DOCUMENTS

2015/0072698 A1* 3/2015 Wang .................... H04W 48/10
                                                    455/450
2016/0309300 A1   10/2016 Dong et al.

FOREIGN PATENT DOCUMENTS

| CN | 103763768 A | 4/2014 |
| EP | 2182752 A1 | 5/2010 |
| WO | 2012042303 A1 | 4/2012 |

* cited by examiner

LOCATING METHOD, USER EQUIPMENT, AND BASE STATION

CROSS-REFERENCE TO RELATED APPLICATIONS

This application is a national stage of International Application No. PCT/CN2014/080644, filed on Jun. 24, 2014, which is hereby incorporated by reference in its entirety.

TECHNICAL FIELD

The present invention relates to the field of communications technologies, and in particular, to a locating method, user equipment, and a base station.

BACKGROUND

Currently, a Bluetooth 4.0 technology is adopted in an increasing quantity of user equipments. Due to a low power consumption feature of the Bluetooth 4.0, a Bluetooth module of user equipment may be always in a working state; and because the Bluetooth uses an omni-directional antenna, a Bluetooth signal is a broadcast signal. In other words, all other devices that have a Bluetooth function and that fall within coverage of a Bluetooth signal of particular user equipment receive the Bluetooth signal of the user equipment.

With development of technologies, user equipment may include: intelligent user equipment such as a computer or a mobile phone, or may include: wearable user equipment such as glasses, a wristwatch, a wristband, or shoes. For a user, intelligent user equipment and wearable user equipment that is worn by the user form a personal area network.

In an existing locating method, a base station receives locating signals of all user equipments that have the Bluetooth function and that are on the personal area network. However, for the base station, receiving a locating signal of wearable user equipment to perform locating is meaningless, which, on the contrary, increases load of a locating system, and reduces a processing capability of the locating system.

SUMMARY

In view of this, the present invention provides a locating method, user equipment, and a base station, which can effectively reduce load of a locating system, and improve a processing capability of the locating system.

According to a first aspect, an embodiment of the present invention provides a locating method. The method includes: receiving, by user equipment, a locating broadcast message sent by a base station, where the locating broadcast message carries a locating list, and the locating list includes an identifier of locatable user equipment; and if the locating list does not include an identifier of the user equipment, ignoring, by the user equipment, a locating signal sent by the base station.

In a first possible implementation manner of the first aspect, the user equipment is primary user equipment, and before the receiving, by user equipment, a locating broadcast message sent by a base station, the method further includes: performing, by the primary user equipment, pairing with secondary user equipment; recording, by the primary user equipment, an identifier of the primary user equipment and an identifier of the secondary user equipment; determining, by the primary user equipment, locatable user equipment in the primary user equipment and the secondary user equipment; and sending, by the primary user equipment, a locating configuration message to the base station, where the locating configuration message carries the identifier of the primary user equipment, the identifier of the secondary user equipment, and a locating enable identifier; the primary user equipment and each secondary user equipment separately correspond to one locating enable identifier, and the locating enable identifier is used to indicate whether user equipment is locatable, so that the base station creates the locating list, where the locating list includes an identifier of user equipment corresponding to a locating enable identifier that indicates that the user equipment is locatable.

With reference to the first possible implementation manner of the first aspect, in a second possible implementation manner, the user equipment is primary user equipment, and after the receiving, by user equipment, a locating broadcast message sent by a base station, the method further includes: receiving, by the primary user equipment, a locating request sent by the secondary user equipment; and if it is determined that the secondary user equipment is locatable secondary user equipment, sending, by the primary user equipment, a locating permission message to the secondary user equipment, so that the secondary user equipment receives the locating signal sent by the base station, and performs locating according to the locating signal.

In a third possible implementation manner of the first aspect, the user equipment is secondary user equipment, and after the ignoring, by the user equipment, a locating signal sent by the base station, the method further includes: sending, by the secondary user equipment, a locating request to primary user equipment; when receiving a locating permission message sent by the primary user equipment, receiving, by the secondary user equipment, a locating signal sent by the base station; and performing, by the secondary user equipment, locating according to the locating signal.

With reference to the first aspect, the first possible implementation manner of the first aspect, the second possible implementation manner of the first aspect, or the third possible implementation manner of the first aspect, in a fourth possible implementation manner, after the receiving, by user equipment, a locating broadcast message sent by a base station, the method further includes: if the locating list includes the identifier of the user equipment, receiving, by the user equipment, a locating signal sent by the base station; and performing, by the user equipment, locating according to the locating signal.

According to a second aspect, an embodiment of the present invention provides a locating method. The method includes: acquiring, by a base station, a locating list, where the locating list includes an identifier of locatable user equipment. The method also includes sending, by the base station, a locating broadcast message to user equipment, where the locating broadcast message carries the locating list, so that the user equipment determines, according to the locating list, whether to receive a locating signal sent by the base station.

In a first possible implementation manner of the second aspect, the acquiring, by a base station, a locating list is specifically: receiving, by the base station, a locating configuration message sent by primary user equipment, where the locating configuration message carries an identifier of the primary user equipment, an identifier of secondary user equipment that is paired with the primary user equipment, and a locating enable identifier; the primary user equipment and each secondary user equipment separately correspond to one locating enable identifier, and the locating enable identifier is used to indicate whether user equipment is locatable;

and creating, by the base station, the locating list according to the locating configuration message, where the locating list includes an identifier of user equipment corresponding to a locating enable identifier that indicates that the user equipment is locatable.

With reference to the first possible implementation manner of the second aspect, in a second possible implementation manner, after the acquiring, by a base station, a locating list, the method further includes: sending, by the base station, the locating list to a location server, so that the location server sends the locating list to another base station in a base station group to which the base station belongs.

In a third possible implementation manner of the second aspect, the acquiring, by a base station, a locating list is specifically: receiving, by the base station, the locating list sent by a location server.

According to a third aspect, an embodiment of the present invention provides a locating method. The method includes: acquiring, by a base station, a locating list, where the locating list includes an identifier of locatable user equipment; receiving, by the base station, a locating signal sent by user equipment, where the locating signal carries an identifier of the user equipment; and if the locating list does not include the identifier of the user equipment, ignoring, by the base station, the locating signal.

In a first possible implementation manner of the third aspect, the user equipment is primary user equipment, and the acquiring, by a base station, a locating list is specifically: receiving, by the base station, a locating configuration message sent by the primary user equipment, where the locating configuration message carries an identifier of the primary user equipment, an identifier of secondary user equipment that is paired with the primary user equipment, and a locating enable identifier; the primary user equipment and each secondary user equipment separately correspond to one locating enable identifier, and the locating enable identifier is used to indicate whether user equipment is locatable; and creating, by the base station, the locating list according to the locating configuration message, where the locating list includes an identifier of user equipment corresponding to a locating enable identifier that indicates that the user equipment is locatable.

With reference to the first possible implementation manner of the third aspect, in a second possible implementation manner, after the acquiring, by a base station, a locating list, the method further includes: sending, by the base station, the locating list to the location server, so that the location server sends the locating list to another base station in a base station group to which the base station belongs.

In a third possible implementation manner of the third aspect, the acquiring, by a base station, a locating list is specifically: receiving, by the base station, the locating list sent by a location server.

With reference to the third aspect, the first possible implementation manner of the third aspect, the second possible implementation manner of the third aspect, or the third possible implementation manner of the third aspect, in a fourth possible implementation manner, after the receiving, by the base station, a locating signal sent by user equipment, the method further includes: if the locating list includes the identifier of the user equipment, acquiring, by the base station, locating information of the user equipment; and sending, by the base station, the locating information of the user equipment to the location server, so that the location server performs locating according to the locating information of the user equipment.

According to a fourth aspect, an embodiment of the present invention provides a locating method. The method includes: performing, by primary user equipment, pairing with secondary user equipment; recording, by the primary user equipment, an identifier of the primary user equipment and an identifier of the secondary user equipment. The method also includes determining, by the primary user equipment, locatable user equipment in the primary user equipment and the secondary user equipment. The method also includes sending, by the primary user equipment, a locating configuration message to a base station, where the locating configuration message carries the identifier of the primary user equipment, the identifier of the secondary user equipment, and a locating enable identifier; the primary user equipment and each secondary user equipment separately correspond to one locating enable identifier, and the locating enable identifier is used to indicate whether user equipment is locatable, so that the base station creates the locating list, where the locating list includes an identifier of user equipment corresponding to a locating enable identifier that indicates that the user equipment is locatable; and sending, by the primary user equipment, a locating signal to the base station, where the locating signal carries the identifier of the primary user equipment, so that when the locating list in the base station does not include the identifier of the primary user equipment, the base station ignores the locating signal.

In a first possible implementation manner of the fourth aspect, after the sending, by the primary user equipment, a locating signal to the base station, the method further includes: receiving, by the primary user equipment, a locating response message sent by the location server; and sending, by the primary user equipment, configuration information to unlocatable secondary user equipment in the secondary user equipment according to the locating response message, where the configuration information is used to instruct the unlocatable secondary user equipment to reduce signal transmit power.

According to a fifth aspect, an embodiment of the present invention provides user equipment. The user equipment includes: a receiving unit, configured to receive a locating broadcast message sent by a base station, where the locating broadcast message carries a locating list, and the locating list includes an identifier of locatable user equipment. The receiving unit is further configured to: if the locating list does not include an identifier of the user equipment, ignore, by the user equipment, a locating signal sent by the base station.

In a first possible implementation manner of the fifth aspect, the user equipment is primary user equipment, and the primary user equipment further includes: a pairing unit, configured to perform pairing with secondary user equipment; a recording unit, configured to record an identifier of the primary user equipment and an identifier of the secondary user equipment; a determining unit, configured to determine locatable user equipment in the primary user equipment and the secondary user equipment; and a sending unit, configured to send a locating configuration message to the base station, where the locating configuration message carries the identifier of the primary user equipment, the identifier of the secondary user equipment that is paired with the primary user equipment, and a locating enable identifier; the primary user equipment and each secondary user equipment separately correspond to one locating enable identifier, and the locating enable identifier is used to indicate whether user equipment is locatable, so that the base station creates the locating list, where the locating list includes an identifier of user equipment corresponding to a locating enable identifier that indicates that the user equipment is locatable.

With reference to the first possible implementation manner of the fifth aspect, in a second possible implementation manner, the user equipment is primary user equipment, and the receiving unit is further configured to receive a locating request sent by the secondary user equipment; and the sending unit is further configured to: if it is determined that the secondary user equipment is locatable secondary user equipment, send a locating permission message to the secondary user equipment, so that the secondary user equipment receives the locating signal sent by the base station, and performs locating according to the locating signal.

In a third possible implementation manner of the fifth aspect, the user equipment is secondary user equipment, and the secondary user equipment further includes: a sending unit, configured to send a locating request to primary user equipment; and the receiving unit is further configured to: when receiving a locating permission message sent by the primary user equipment, receive the locating signal sent by the base station.

With reference to the fifth aspect, the first possible implementation manner of the fifth aspect, the second possible implementation manner of the fifth aspect, or the third possible implementation manner of the fifth aspect, in a fourth possible implementation manner, the receiving unit is further configured to: if the locating list includes the identifier of the user equipment, receive, by the user equipment, the locating signal sent by the base station; and the user equipment further includes: a locating unit, configured to perform locating according to the locating signal.

According to a sixth aspect, an embodiment of the present invention provides a base station. The base station includes: an acquiring unit, configured to acquire a locating list, where the locating list includes an identifier of locatable user equipment. The base station also includes a sending unit, configured to send a locating broadcast message to user equipment, where the locating broadcast message carries the locating list, so that the user equipment determines, according to the locating list, whether to receive a locating signal sent by the base station.

In a first possible implementation manner of the sixth aspect, the acquiring unit is specifically configured to receive a locating configuration message sent by primary user equipment, where the locating configuration message carries an identifier of the primary user equipment, an identifier of secondary user equipment that is paired with the primary user equipment, and a locating enable identifier; the primary user equipment and each secondary user equipment separately correspond to one locating enable identifier, and the locating enable identifier is used to indicate whether user equipment is locatable; and the base station further includes: a creation unit, configured to create the locating list according to the locating configuration message, where the locating list includes an identifier of user equipment corresponding to a locating enable identifier that indicates that the user equipment is locatable.

With reference to the first possible implementation manner of the sixth aspect, in a second possible implementation manner, the sending unit is further configured to: send, by the base station, the locating list to a location server, so that the location server sends the locating list to another base station in a base station group to which the base station belongs.

In a third possible implementation manner of the sixth aspect, the acquiring unit is specifically configured to receive the locating list sent by a location server.

According to a seventh aspect, an embodiment of the present invention provides a base station. The base station includes: a first acquiring unit, configured to acquire a locating list, where the locating list includes an identifier of locatable user equipment. The base station also includes a receiving unit, configured to receive a locating signal sent by user equipment, where the locating signal carries an identifier of the user equipment. The base station also includes a second acquiring unit, configured to: if the locating list does not include the identifier of the user equipment, ignore the locating signal.

In a first possible implementation manner of the seventh aspect, the user equipment is primary user equipment, and the first acquiring unit is specifically configured to: receive a locating configuration message sent by the primary user equipment, where the locating configuration message carries an identifier of the primary user equipment, an identifier of secondary user equipment that is paired with the primary user equipment, and a locating enable identifier; the primary user equipment and each secondary user equipment separately correspond to one locating enable identifier, and the locating enable identifier is used to indicate whether user equipment is locatable; and create the locating list according to the locating configuration message, where the locating list includes an identifier of user equipment corresponding to a locating enable identifier that indicates that the user equipment is locatable.

With reference to the first possible implementation manner of the seventh aspect, in a second possible implementation manner, the base station further includes: a first sending unit, configured to send the locating list to the location server, so that the location server sends the locating list to another base station in a base station group to which the base station belongs.

In a third possible implementation manner of the seventh aspect, the first acquiring unit is specifically configured to receive the locating list sent by the location server.

With reference to the seventh aspect, the first possible implementation manner of the seventh aspect, the second possible implementation manner of the seventh aspect, or the third possible implementation manner of the seventh aspect, in a fourth possible implementation manner, the second acquiring unit is further configured to: if the locating list includes the identifier of the user equipment, acquire locating information of the user equipment; and the base station further includes: a second sending unit, configured to send the locating information of the user equipment to the location server, so that the location server performs locating according to the locating information of the user equipment.

According to an eighth aspect, an embodiment of the present invention provides user equipment, where the user equipment is primary user equipment. The primary user equipment includes: a pairing unit, configured to perform pairing with secondary user equipment. The primary user equipment also includes a recording unit, configured to record an identifier of the primary user equipment and an identifier of the secondary user equipment. The primary user equipment also includes a determining unit, configured to determine locatable user equipment in the primary user equipment and the secondary user equipment. The primary user equipment also includes a sending unit, configured to send a locating configuration message to a base station, where the locating configuration message carries the identifier of the primary user equipment, the identifier of the secondary user equipment, and a locating enable identifier; the primary user equipment and each secondary user equipment separately correspond to one locating enable identifier, and the locating enable identifier is used to indicate whether user equipment is locatable, so that the base station creates the locating list, where the locating list includes an identifier of user equipment corresponding to a locating enable identifier that indicates that the user equipment is locatable, where the sending unit is further configured to send a locating signal to the base station, where the locating signal carries the identifier of the primary user equipment, so that when the locating list in the base station does not include the identifier of the primary user equipment, the base station ignores the locating signal.

In a first possible implementation manner of the eighth aspect, the user equipment further includes: a receiving unit, configured to receive a locating response message sent by the location server; and the sending unit is further configured to send configuration information to unlocatable secondary user equipment in the secondary user equipment according to the locating response message, where the configuration information is used to instruct the unlocatable secondary user equipment to reduce signal transmit power.

According to a ninth aspect, an embodiment of the present invention provides user equipment, where the user equipment includes: a processor, a transceiver, and a memory, where the transceiver is configured to receive a locating broadcast message sent by a base station, where the locating broadcast message carries a locating list, and the locating list includes an identifier of locatable user equipment; and the transceiver is further configured to: if the locating list does not include an identifier of the user equipment, ignore a locating signal sent by the base station.

In a first possible implementation manner of the ninth aspect, the user equipment is primary user equipment; the processor is configured to perform pairing with secondary user equipment, record an identifier of the primary user equipment and an identifier of the secondary user equipment, and determine locatable user equipment in the primary user equipment and the secondary user equipment; and the transceiver is further configured to send a locating configuration message to the base station, where the locating configuration message carries the identifier of the primary user equipment, the identifier of the secondary user equipment, and a locating enable identifier; the primary user equipment and each secondary user equipment separately correspond to one locating enable identifier, and the locating enable identifier is used to indicate whether user equipment is locatable, so that the base station creates the locating list, where the locating list includes an identifier of user equipment corresponding to a locating enable identifier that indicates that the user equipment is locatable.

With reference to the first possible implementation manner of the ninth aspect, in a second possible implementation manner, the user equipment is primary user equipment; the transceiver is further configured to receive a locating request sent by the secondary user equipment; and the transceiver is further configured to: if it is determined that the secondary user equipment is locatable secondary user equipment, send a locating permission message to the secondary user equipment, so that the secondary user equipment receives the locating signal sent by the base station, and performs locating according to the locating signal.

In a third possible implementation manner of the ninth aspect, the user equipment is secondary user equipment; the transceiver is further configured to send a locating request to primary user equipment; the transceiver is further configured to: when receiving a locating permission message sent by the primary user equipment, receive, by the secondary user equipment, the locating signal sent by the base station; and the processor is configured to perform locating according to the locating signal.

With reference to the ninth aspect, the first possible implementation manner of the ninth aspect, the second possible implementation manner of the ninth aspect, or the third possible implementation manner of the ninth aspect, in a fourth possible implementation manner, the transceiver is further configured to: if the locating list includes the identifier of the user equipment, receive the locating signal sent by the base station; and the processor is configured to perform locating according to the locating signal.

According to a tenth aspect, an embodiment of the present invention provides a base station. The base station includes: a processor, a transceiver, and a memory. The processor is configured to acquire a locating list, where the locating list includes an identifier of locatable user equipment. The transceiver is configured to send a locating broadcast message to user equipment, where the locating broadcast message carries the locating list, so that the user equipment determines, according to the locating list, whether to receive a locating signal sent by the base station.

In a first possible implementation manner of the tenth aspect, the processor is specifically configured to receive, by using the transceiver, a locating configuration message sent by primary user equipment, where the locating configuration message carries an identifier of the primary user equipment, an identifier of secondary user equipment that is paired with the primary user equipment, and a locating enable identifier; the primary user equipment and each secondary user equipment separately correspond to one locating enable identifier, and the locating enable identifier is used to indicate whether user equipment is locatable; and create the locating list according to the locating configuration message, where the locating list includes an identifier of user equipment corresponding to a locating enable identifier that indicates that the user equipment is locatable.

With reference to the first possible implementation manner of the tenth aspect, in a second possible implementation manner, the transceiver is further configured to send the locating list to a location server, so that the location server sends the locating list to another base station in a base station group to which the base station belongs.

In a third possible implementation manner of the tenth aspect, the processor is specifically configured to receive, by using the transceiver, the locating list sent by a location server.

According to an eleventh aspect, an embodiment of the present invention provides a base station. The base station includes: a processor, a transceiver, and a memory, where the processor is configured to acquire a locating list, where the locating list includes an identifier of locatable user equipment. The transceiver is configured to receive a locating signal sent by user equipment, where the locating signal carries an identifier of the user equipment. The processor is further configured to: if the locating list does not include the identifier of the user equipment, ignore the locating signal.

In a first possible implementation manner of the eleventh aspect, the user equipment is primary user equipment, and the processor is specifically configured to: receive, by using the transceiver, a locating configuration message sent by the primary user equipment, where the locating configuration message carries an identifier of the primary user equipment, an identifier of secondary user equipment that is paired with the primary user equipment, and a locating enable identifier; the primary user equipment and each secondary user equipment separately correspond to one locating enable identifier, and the locating enable identifier is used to indicate whether user equipment is locatable; and create the locating list according to the locating configuration message, where the locating list includes an identifier of user equipment corresponding to a locating enable identifier that indicates that the user equipment is locatable.

With reference to the first possible implementation manner of the eleventh aspect, in a second possible implementation manner, the transceiver is further configured to send the locating list to the location server, so that the location server sends the locating list to another base station in a base station group to which the base station belongs.

In a third possible implementation manner of the eleventh aspect, the processor is specifically configured to: receive, by using the transceiver, the locating list sent by a location server.

With reference to the eleventh aspect, the first possible implementation manner of the eleventh aspect, the second possible implementation manner of the eleventh aspect, or the third possible implementation manner of the eleventh aspect, in a fourth possible implementation manner, the processor is further configured to: if the locating list includes the identifier of the user equipment, acquire, by the base station, locating information of the user equipment; and the transceiver is further configured to send the locating information of the user equipment to the location server, so that the location server performs locating according to the locating information of the user equipment.

According to a twelfth aspect, an embodiment of the present invention provides user equipment, where the user equipment is primary user equipment. The user equipment includes: a processor, a transceiver, and a memory, where the processor is configured to perform pairing with secondary user equipment, record an identifier of the primary user equipment and an identifier of the secondary user equipment, and determine locatable user equipment in the primary user equipment and the secondary user equipment. The transceiver is configured to send a locating configuration message to a base station, where the locating configuration message carries the identifier of the primary user equipment, the identifier of the secondary user equipment, and a locating enable identifier. The primary user equipment and each secondary user equipment separately correspond to one locating enable identifier, and the locating enable identifier is used to indicate whether user equipment is locatable, so that the base station creates the locating list, where the locating list includes an identifier of user equipment corresponding to a locating enable identifier that indicates that the user equipment is locatable. The transceiver is further configured to send a locating signal to the base station, where the locating signal carries the identifier of the primary user equipment, so that when the locating list in the base station does not include the identifier of the primary user equipment, the base station ignores the locating signal.

In a first possible implementation manner of the twelfth aspect, the transceiver is further configured to receive a locating response message sent by the location server; and the transceiver is further configured to send configuration information to unlocatable secondary user equipment in the secondary user equipment according to the locating response message, where the configuration information is used to instruct the unlocatable secondary user equipment to reduce signal transmit power.

By means of the foregoing solutions, whether user equipment is locatable is determined according to a locating list, and user equipment that is not included in the locating list ignores a locating signal sent by a base station, and does not need to be located. Therefore, power consumption of user equipment that does not need to be located can be effectively reduced, thereby reducing load of a locating system, and improving a processing capability of the locating system.

DETAILED DESCRIPTION OF ILLUSTRATIVE EMBODIMENTS

To make the objectives, technical solutions, and advantages of the present invention clearer, the following further describes the present invention in detail with reference to the accompanying drawings. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
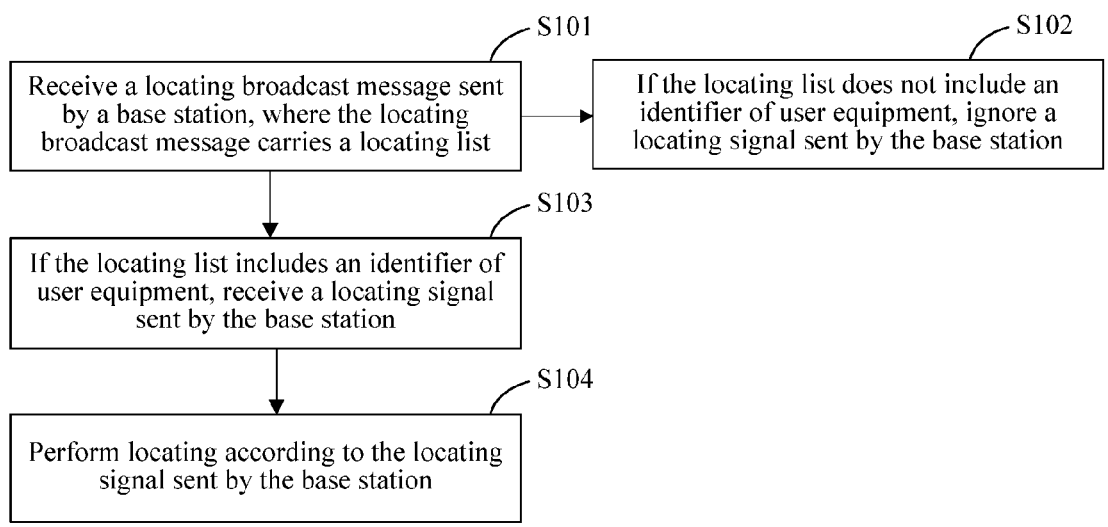
FIG. 1 is a schematic flowchart of a locating method according to Embodiment 1 of the present invention.

The following describes a locating method in detail according to Embodiment 1 of the present invention by using FIG. 1 as an example. FIG. 1 is a schematic flowchart of a locating method according to Embodiment 1 of the present invention. The locating method is executed by user equipment. As shown in FIG. 1, the locating method includes the following steps.

Step S101: Receive a locating broadcast message sent by a base station, where the locating broadcast message carries a locating list.

The locating list includes an identifier of locatable user equipment. An identifier of user equipment may be specifically: an identity (identification, ID) of the user equipment, an address of the user equipment, or the like.

Optionally, the locating list is created by the base station according to an identifier of primary user equipment, an identifier of secondary user equipment that is paired with the primary user equipment, and a locating enable identifier that are sent by the primary user equipment. The primary user equipment is user equipment that actively initiates a search and performs pairing.

Therefore, when user equipment is primary user equipment, before step S101, the locating method may further include the following steps: performing pairing with secondary user equipment; recording an identifier of the primary user equipment and an identifier of the secondary user equipment that is paired with the primary user equipment; determining locatable user equipment in the primary user equipment and the secondary user equipment; and sending a locating configuration message to the base station, where the locating configuration message carries the identifier of the primary user equipment, the identifier of the secondary user equipment that is paired with the primary user equipment, and the locating enable identifier; the primary user equipment and each secondary user equipment separately correspond to one locating enable identifier, and the locating enable identifier is used to indicate whether user equipment is locatable, so that the base station creates the locating list according to the locating configuration message, where the locating list includes an identifier of user equipment corresponding to a locating enable identifier that indicates that the user equipment is locatable.

For example, when the locating enable identifier is 1, it indicates that the user equipment is locatable; or when the locating enable identifier is 0, it indicates that the user equipment is unlocatable; therefore, an identifier of each locatable user equipment in the primary user equipment and the secondary user equipment corresponds to one locating enable identifier 1, and an identifier of each unlocatable user equipment in the primary user equipment and the secondary user equipment corresponds to one locating enable identifier 0. After receiving the locating configuration message, the base station acquires an identifier of user equipment corresponding to the locating enable identifier 1, and creates a locating list, where the locating list includes only the identifier of the user equipment corresponding to the locating enable identifier 1, that is, the identifier of the user equipment that the primary user equipment determines to be locatable.

Optionally, the locating list is sent by a location server to the base station.

After creating or receiving the locating list, the base station adds the locating list to a locating broadcast message and sends the locating broadcast message to all user equipments within coverage of the base station.

Step S102: If the locating list does not include an identifier of the user equipment, ignore a locating signal sent by the base station.

If the locating list does not include the identifier of the user equipment, and the user equipment is secondary user equipment, a locating request may be sent to primary user equipment. If the primary user equipment permits the secondary user equipment to perform locating, the primary user equipment determines that the secondary user equipment is locatable user equipment, and sends a locating permission message to the secondary user equipment. When the secondary user equipment receives the locating permission message sent by the primary user equipment, the secondary user equipment receives the locating signal sent by the base station, and performs step S104.

If the locating list includes the identifier of the user equipment, step S103 and step S104 are performed.

Step S103: If the locating list includes an identifier of the user equipment, receive a locating signal sent by the base station.

After receiving the locating list, the user equipment searches the locating list for the identifier of the user equipment; and if the locating list includes the identifier of the user equipment, receives the locating signal sent by the base station, and performs step S104.

S104: Perform locating according to the locating signal sent by the base station.

By means of the locating method according to Embodiment 1 of the present invention, whether user equipment is locatable is determined according to a locating list, and user equipment that is not included in the locating list ignores a locating signal sent by a base station, and does not need to be located. Therefore, power consumption of secondary user equipment can be effectively reduced, thereby reducing load of a locating system, and improving a processing capability of the locating system.

Figure 2:
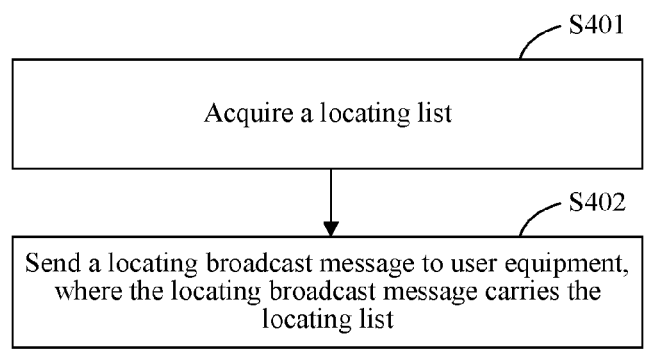
FIG. 2 is a schematic flowchart of a locating method according to Embodiment 2 of the present invention.

The following describes a locating method in detail according to Embodiment 2 of the present invention by using FIG. 2 as an example. FIG. 2 is a schematic flowchart of a locating method according to Embodiment 2 of the present invention. The locating method is executed by a base station. As shown in FIG. 2, the locating method includes the following steps.

Step S201: Acquire a locating list.

The locating list includes an identifier of locatable user equipment. An identifier of user equipment may be specifically: an ID of the user equipment, an address of the user equipment, or the like.

Optionally, the locating list is created by the base station according to an identifier of primary user equipment, an identifier of secondary user equipment that is paired with the primary user equipment, and a locating enable identifier that are sent by the primary user equipment. The primary user equipment is user equipment that actively initiates a search and performs pairing.

Therefore, step S201 is specifically: receiving, by the base station, a locating configuration message sent by primary user equipment, where the locating configuration message carries an identifier of the primary user equipment, an identifier of secondary user equipment that is paired with the primary user equipment, and a locating enable identifier; the primary user equipment and each secondary user equipment separately correspond to one locating enable identifier, and the locating enable identifier is used to indicate whether user equipment is locatable; and creating, by the base station, the locating list according to the identifier of the primary user equipment, the identifier of the secondary user equipment that is paired with the primary user equipment, and the locating enable identifier, where the locating list includes an identifier of user equipment corresponding to a locating enable identifier that indicates that the user equipment is locatable.

For example, when the locating enable identifier is 1, it indicates that the user equipment is locatable; or when the locating enable identifier is 0, it indicates that the user equipment is unlocatable. After receiving the locating configuration message, the base station acquires an identifier of user equipment corresponding to the locating enable identifier 1, and creates a locating list, where the locating list includes only the identifier of the user equipment corresponding to the locating enable identifier 1, that is, the identifier of the user equipment that the primary user equipment determines to be locatable.

In addition, after step S201, the locating method may further include: sending, by the base station, the locating list to a location server, so that the location server sends the locating list to another base station in a base station group to which the base station belongs.

Optionally, step S201 is specifically: receiving, by a base station, the locating list sent by a location server.

Step S202: Send a locating broadcast message to user equipment, where the locating broadcast message carries the locating list.

The user equipment determines, according to the locating list, whether to receive a locating signal sent by the base station. Specifically, after receiving the locating list, the user equipment searches the locating list for an identifier of the user equipment; and if the locating list includes the identifier of the user equipment, receives the locating signal sent by the base station, and processes the locating signal to perform locating. If the locating list does not include the identifier of the user equipment, and the user equipment is secondary user equipment, a locating request may be sent to primary user equipment. If the primary user equipment permits the secondary user equipment to perform locating, the primary user equipment determines that the secondary user equipment is locatable user equipment, and sends a locating permission message to the secondary user equipment. When the secondary user equipment receives the locating permission message sent by the primary user equipment, the secondary user equipment receives the locating signal sent by the base station, and processes the locating signal to perform locating.

By means of the locating method according to Embodiment 2 of the present invention, a base station sends a locating list to user equipment, whether the user equipment is locatable is determined according to the locating list, and only user equipment that is included in the locating list can receive a locating signal sent by the base station, to perform locating, which can effectively reduce power consumption of secondary user equipment, thereby reducing load of a locating system, and improving a processing capability of the locating system.

Figure 3:
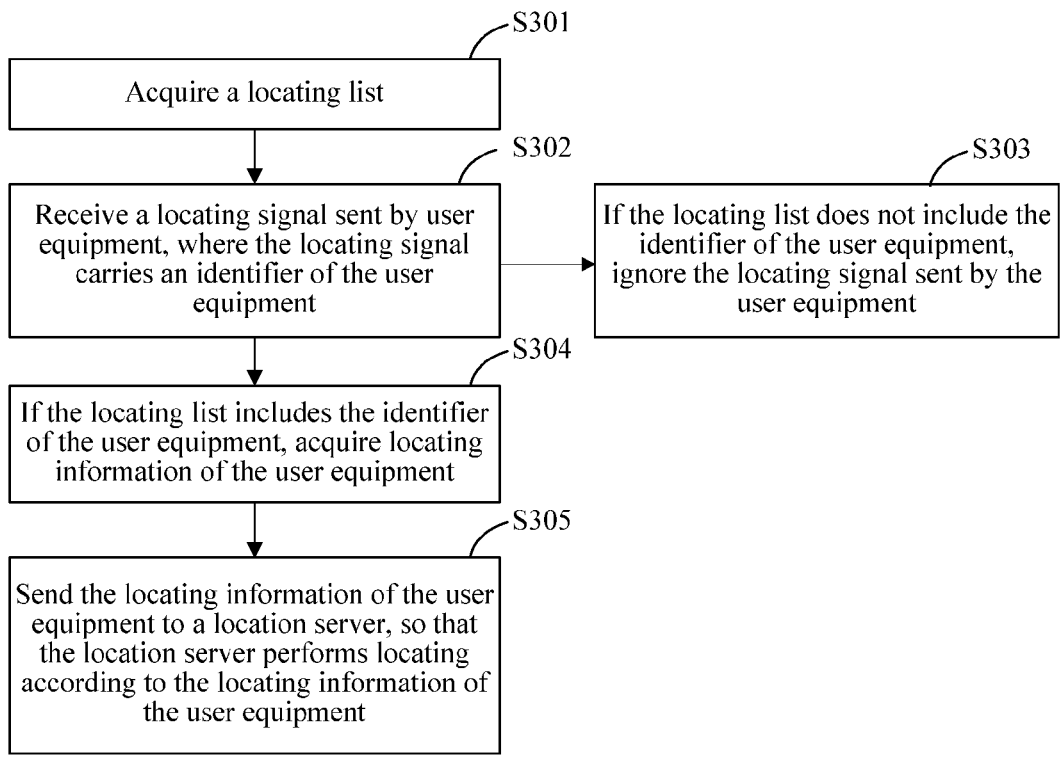
FIG. 3 is a schematic flowchart of a locating method according to Embodiment 3 of the present invention.

The following describes a locating method in detail according to Embodiment 3 of the present invention by using FIG. 3 as an example. FIG. 3 is a schematic flowchart of a locating method according to Embodiment 3 of the present invention. The locating method is executed by a base station. As shown in FIG. 3, the locating method includes the following steps:

Step S301: Acquire a locating list.

The locating list includes an identifier of locatable user equipment.

An identifier of user equipment may be specifically: an ID of the user equipment, an address of the user equipment, or the like.

Optionally, the locating list is created by the base station according to an identifier of primary user equipment, an identifier of secondary user equipment that is paired with the primary user equipment, and a locating enable identifier that are sent by the primary user equipment. The primary user equipment is user equipment that actively initiates a search and performs pairing, and the secondary user equipment is user equipment that is searched for and that is paired with the primary user equipment.

Therefore, step S301 is specifically: receiving, by the base station, a locating configuration message sent by primary user equipment, where the locating configuration message carries an identifier of the primary user equipment, an identifier of secondary user equipment that is paired with the primary user equipment, and a locating enable identifier; the primary user equipment and each secondary user equipment separately correspond to one locating enable identifier, and the locating enable identifier is used to indicate whether user equipment is locatable; and creating, by the base station, the locating list according to the identifier of the primary user equipment, the identifier of the secondary user equipment that is paired with the primary user equipment, and the locating enable identifier, where the locating list includes an identifier of user equipment corresponding to a locating enable identifier that indicates that the user equipment is locatable.

For example, when the locating enable identifier is 1, it indicates that the user equipment is locatable; or when the locating enable identifier is 0, it indicates that the user equipment is unlocatable. After receiving the locating configuration message, the base station acquires an identifier of user equipment corresponding to the locating enable identifier 1, and creates a locating list, where the locating list includes only the identifier of the user equipment corresponding to the locating enable identifier 1, that is, the identifier of the user equipment that the primary user equipment determines to be locatable.

In addition, after step S301, the locating method may further include: sending, by the base station, the locating list to a location server, so that the location server sends the locating list to another base station in a base station group to which the base station belongs.

Optionally, step S301 is specifically: receiving, by a base station, the locating list sent by a location server.

Step S302: Receive a locating signal sent by user equipment, where the locating signal carries an identifier of the user equipment.

Step S303: If the locating list does not include the identifier of the user equipment, ignore the locating signal sent by the user equipment.

If the locating list does not include the identifier of the user equipment, no processing is performed on the locating signal sent by the user equipment, thereby reducing load and power consumption of the base station.

If the locating list includes the identifier of the user equipment, step S304 and step S305 are performed.

Step S304: If the locating list includes the identifier of the user equipment, acquire locating information of the user equipment.

Optionally, the locating signal further carries the locating information. If the locating list includes the identifier of the user equipment, the base station acquires locating information of the user equipment from the locating signal. The locating information specifically includes: information such as device description information (for example, a Bluetooth address and a device identifier), location coordinates, and floor information.

Optionally, the locating signal further carries first locating information. If the locating list includes the identifier of the user equipment, the base station acquires first locating information of the user equipment from the locating signal, and acquires second locating information of the user equipment by using a multi-antenna array. The first locating information is specifically device description information (for example, a Bluetooth address and a device identifier).

The second locating information is specifically an angle at which the user equipment receives a signal.

Step S305: Send the locating information of the user equipment to a location server, so that the location server performs locating according to the locating information of the user equipment.

The location server calculates the location coordinates of the user equipment according to the locating information of the user equipment, and sends the location coordinates to the user equipment.

By means of the locating method according to Embodiment 3 of the present invention, a base station locates only user equipment that is in a locating list, processes only a locating signal received from the user equipment included in the locating list, and ignores a locating signal sent by user equipment that is not included in the locating list. The base station does not need to process received locating signals sent by all user equipments; therefore, load of a locating system can be effectively reduced, and a processing capability of the locating system can be effectively improved.

Figure 4:
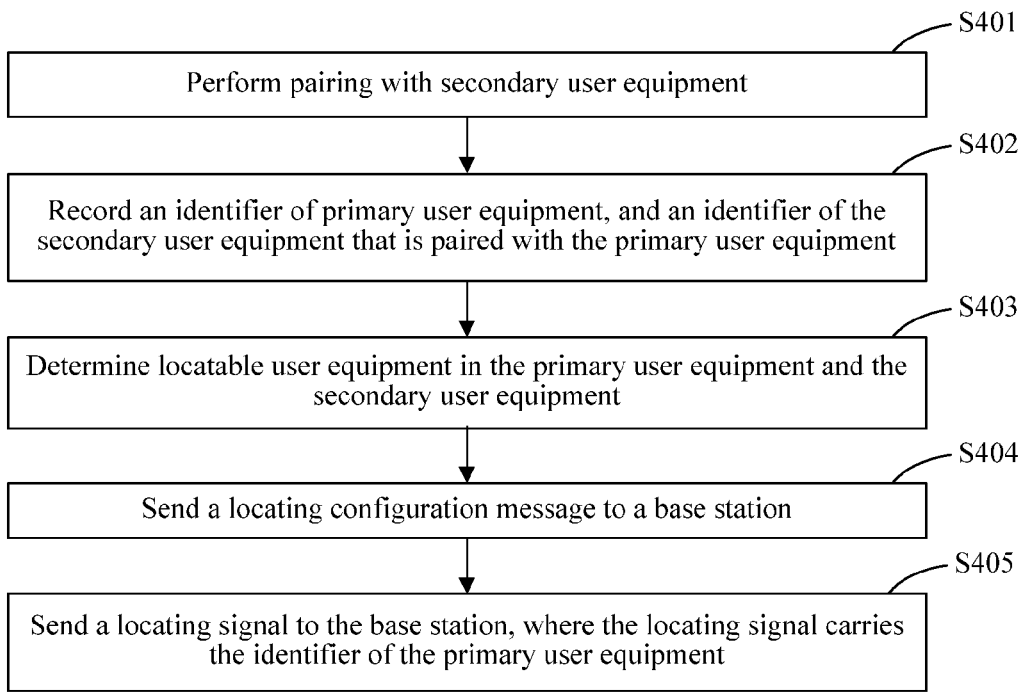
FIG. 4 is a schematic flowchart of a locating method according to Embodiment 4 of the present invention.

The following describes a locating method in detail according to Embodiment 4 of the present invention by using FIG. 4 as an example. FIG. 4 is a schematic flowchart of a locating method according to Embodiment 4 of the present invention. The locating method is executed by primary user equipment. As shown in FIG. 4, the locating method includes the following steps.

Step S401: Perform pairing with secondary user equipment.

The primary user equipment is user equipment that actively initiates a search and performs pairing, and user equipment that is searched for and that is paired with the primary user equipment is the secondary user equipment.

Step S402: Record an identifier of primary user equipment, and an identifier of the secondary user equipment that is paired with the primary user equipment.

An identifier of user equipment may be specifically: an ID of the user equipment, an address of the user equipment, or the like.

Step S403: Determine locatable user equipment in the primary user equipment and the secondary user equipment.

The primary user equipment may determine, according to setting by a user, whether the primary user equipment needs to be located. If the user chooses to enable a locating function, it is determined that the primary user equipment is locatable user equipment. If the user chooses to prohibit the locating function from being enabled, it is determined that the primary user equipment is unlocatable user equipment.

The primary user equipment may determine, according to a locating request of the secondary user equipment, whether the secondary user equipment is locatable. After receiving the locating request of the secondary user equipment, the primary user equipment prompts the user whether the secondary user equipment is permitted to be located. If the user chooses to permit the secondary user equipment to enable a locating function, it is determined that the secondary user equipment is locatable user equipment. If the user chooses to prohibit the secondary user equipment from enabling the locating function, it is determined that the secondary user equipment is unlocatable user equipment.

Step S404: Send a locating configuration message to a base station.

The locating configuration message carries the identifier of the primary user equipment, the identifier of the secondary user equipment that is paired with the primary user equipment, and a locating enable identifier; the primary user equipment and each secondary user equipment separately correspond to one locating enable identifier, and the locating enable identifier is used to indicate whether user equipment is locatable.

The base station creates a locating list according to the identifier of the primary user equipment, the identifier of the secondary user equipment that is paired with the primary user equipment, and the locating enable identifier, where the locating list includes an identifier of user equipment corresponding to a locating enable identifier that indicates that the user equipment is locatable.

For example, when the locating enable identifier is 1, it indicates that the user equipment is locatable; or when the locating enable identifier is 0, it indicates that the user equipment is unlocatable. After receiving the locating configuration message, the base station acquires an identifier of user equipment corresponding to the locating enable identifier 1, and creates a locating list, where the locating list includes only the identifier of the user equipment corresponding to the locating enable identifier 1, that is, the identifier of the user equipment that the primary user equipment determines to be locatable.

Step S405: Send a locating signal to the base station, where the locating signal carries the identifier of the primary user equipment.

When receiving the locating signal sent by the primary user equipment, the base station acquires the identifier of the primary user equipment from the locating signal, and then performs matching in the locating list. If the locating list does not include the identifier of the primary user equipment, ignore the locating signal sent by the primary user equipment. If the locating list includes the identifier of the primary user equipment, the base station acquires locating information of the primary user equipment, and sends the locating information of the primary user equipment to a location server.

Figure 5:
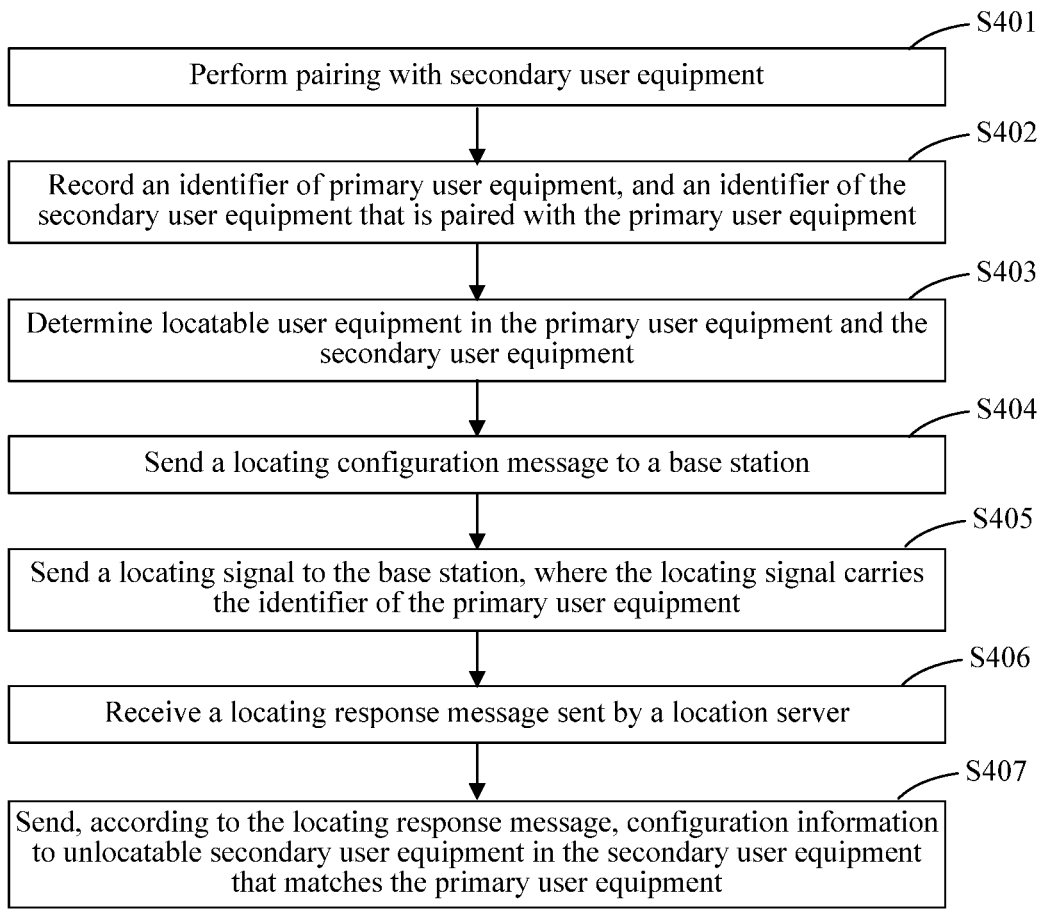
FIG. 5 is a schematic flowchart of another locating method according to Embodiment 4 of the present invention.

In addition, as shown in FIG. 5, if the locating list includes the identifier of the primary user equipment, after step S405, the method may further include the following steps.

Step S406: Receive a locating response message sent by a location server.

After receiving the locating information of the primary user equipment that is sent by the base station, the location server sends a locating response message to the primary user equipment, to notify the primary user equipment that the location server already begins to perform locating for the primary user equipment.

Step S407: Send, according to the locating response message, configuration information to unlocatable secondary user equipment in the secondary user equipment that matches the primary user equipment.

The configuration information is used to instruct the secondary user equipment to reduce signal transmit power.

The base station processes only a locating signal from user equipment that is included in the locating list, and signal transmit power of unlocatable secondary user equipment only needs to meet that the primary user equipment can receive a signal; therefore, the primary user equipment sends configuration information to the unlocatable secondary user equipment, to instruct the unlocatable secondary user equipment to reduce the signal transmit power, thereby reducing power consumption of the secondary user equipment.

By means of the locating method according to Embodiment 4 of the present invention, primary user equipment notifies a base station of locatable user equipment, so that the base station processes only a locating signal from the locatable user equipment, and does not need to process received locating signals sent by all user equipments. In addition, after receiving a locating response message sent by a location server, the primary user equipment sends a configuration message to unlocatable secondary user equipment to instruct the secondary user equipment to reduce signal transmit power, which can effectively reduce power consumption of the secondary user equipment; therefore, load of a locating system can be effectively reduced, and a processing capability of the locating system can be effectively improved.

Figure 6:
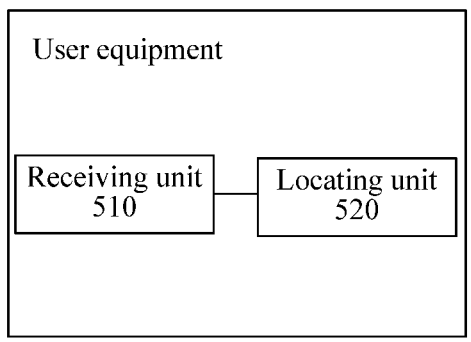
FIG. 6 is a schematic structural diagram of user equipment according to Embodiment 5 of the present invention.

The following describes user equipment in detail according to Embodiment 5 of the present invention by using FIG. 6 as an example. FIG. 6 is a schematic structural diagram of user equipment according to Embodiment 5 of the present invention. The user equipment is used to implement the locating method according to Embodiment 1 of the present invention.

As shown in FIG. 6, the user equipment includes: a receiving unit 510 and a locating unit 520.

The receiving unit 510 is configured to receive a locating broadcast message sent by a base station, where the locating broadcast message carries a locating list.

The locating list includes an identifier of locatable user equipment. An identifier of user equipment may be specifically: an ID of the user equipment, an address of the user equipment, or the like.

Optionally, the locating list is created by the base station according to an identifier of primary user equipment, an identifier of secondary user equipment that is paired with the primary user equipment, and a locating enable identifier that are sent by the primary user equipment. The primary user equipment is user equipment that actively initiates a search and performs pairing.

Figure 7:
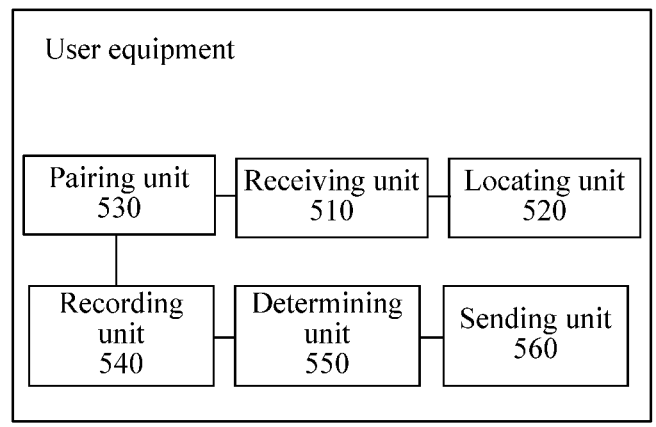
FIG. 7 is a schematic structural diagram of another user equipment according to Embodiment 5 of the present invention.

As shown in FIG. 7, the user equipment may further include: a pairing unit 530, a recording unit 540, a determining unit 550, and a sending unit 560. When the user equipment is primary user equipment, the pairing unit 530 is configured to perform pairing with secondary user equipment; the recording unit 540 is configured to record an identifier of the primary user equipment, and an identifier of the secondary user equipment that is paired with the primary user equipment; the determining unit 550 is configured to determine locatable user equipment in the primary user equipment and the secondary user equipment; and the sending unit 560 is configured to send a locating configuration message to the base station, where the locating configuration message carries the identifier of the primary user equipment, the identifier of the secondary user equipment that is paired with the primary user equipment, and a locating enable identifier; the primary user equipment and each secondary user equipment separately correspond to one locating enable identifier, and the locating enable identifier is used to indicate whether user equipment is locatable, so that the base station creates the locating list according to the locating configuration message, where the locating list includes an identifier of user equipment corresponding to a locating enable identifier that indicates that the user equipment is locatable.

For example, when the locating enable identifier is 1, it indicates that the user equipment is locatable; or when the locating enable identifier is 0, it indicates that the user equipment is unlocatable; therefore, an identifier of each locatable user equipment in the primary user equipment and the secondary user equipment corresponds to one locating enable identifier 1, and an identifier of each unlocatable user equipment in the primary user equipment and the secondary user equipment corresponds to one locating enable identifier 0. After receiving the locating configuration message, the base station acquires an identifier of user equipment corresponding to the locating enable identifier 1, and creates a locating list, where the locating list includes only the identifier of the user equipment corresponding to the locating enable identifier 1, that is, the identifier of the user equipment that the primary user equipment determines to be locatable.

Optionally, the locating list is sent by a location server to the base station.

After creating or receiving the locating list, the base station adds the locating list to a locating broadcast message and sends the locating broadcast message to all user equipments within coverage of the base station.

The receiving unit 510 is further configured to: if the locating list does not include the identifier of the user equipment, ignore a locating signal sent by the base station.

If the locating list does not include the identifier of the user equipment, and the user equipment is secondary user equipment, the sending unit 560 is further configured to send a locating request to the primary user equipment. If the primary user equipment permits the secondary user equipment to be located, the receiving unit 510 is further configured to: when receiving a locating permission message sent by the primary user equipment, receive the locating signal sent by the base station.

The receiving unit 510 is further configured to: if the locating list includes the identifier of the user equipment, receive the locating signal sent by the base station.

After receiving the locating list, the receiving unit 510 searches the locating list for the identifier of the user equipment; and if the locating list includes the identifier of the user equipment, receives the locating signal sent by the base station.

Accordingly, when the user equipment is primary user equipment, the receiving unit 510 is further configured to receive a locating request sent by the secondary user equipment. The sending unit 560 is further configured to: if it is determined that the secondary user equipment is locatable secondary user equipment, send a locating permission message to the secondary user equipment, so that the secondary user equipment receives the locating signal sent by the base station, and performs locating according to the locating signal.

The locating unit 520 is configured to perform locating according to the locating signal sent by the base station.

By means of the user equipment according to Embodiment 5 of the present invention, whether the user equipment is locatable is determined according to a locating list, and user equipment that is not included in the locating list ignores a locating signal sent by a base station, and does not need to be located. Therefore, power consumption of secondary user equipment can be effectively reduced, thereby reducing load of a locating system, and improving a processing capability of the locating system.

Figure 8:
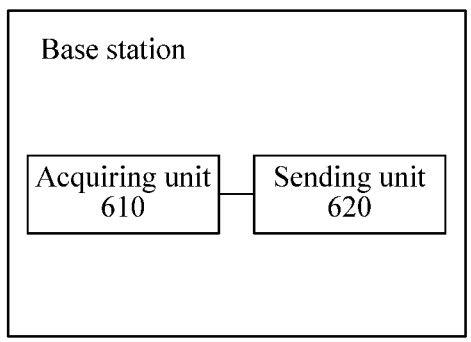
FIG. 8 is a schematic structural diagram of a base station according to Embodiment 6 of the present invention.

The following describes a base station in detail according to Embodiment 6 of the present invention by using FIG. 8 as an example. FIG. 8 is a schematic structural diagram of a base station according to Embodiment 6 of the present invention. The base station is used to implement the locating method according to Embodiment 2 of the present invention.

As shown in FIG. 8, the base station includes: an acquiring unit 610 and a sending unit 620.

The acquiring unit 610 is configured to acquire a locating list.

The locating list includes an identifier of locatable user equipment. An identifier of user equipment may be specifically: an ID of the user equipment, an address of the user equipment, or the like.

Optionally, the locating list is created by the base station according to an identifier of primary user equipment, an identifier of secondary user equipment that is paired with the primary user equipment, and a locating enable identifier that are sent by the primary user equipment. The primary user equipment is user equipment that actively initiates a search and performs pairing.

Therefore, the acquiring unit 610 is specifically configured to receive a locating configuration message sent by the primary user equipment, where the locating configuration message carries an identifier of the primary user equipment, an identifier of secondary user equipment that is paired with the primary user equipment, and a locating enable identifier; the primary user equipment and each secondary user equipment separately correspond to one locating enable identifier, and the locating enable identifier is used to indicate whether user equipment is locatable.

The acquiring unit 610 creates the locating list according to the identifier of the primary user equipment, the identifier of the secondary user equipment that is paired with the primary user equipment, and the locating enable identifier. For example, when the locating enable identifier is 1, it indicates that the user equipment is locatable; or when the locating enable identifier is 0, it indicates that the user equipment is unlocatable. After receiving the locating configuration message, the acquiring unit 810 acquires an identifier of user equipment corresponding to the locating enable identifier 1, and creates a locating list, where the locating list includes only the identifier of the user equipment corresponding to the locating enable identifier 1, that is, the identifier of the user equipment that the primary user equipment determines to be locatable.

In addition, the sending unit 620 may be configured to send the locating list to a location server, so that the location server sends the locating list to another base station in a base station group to which the base station belongs.

Optionally, the acquiring unit 610 is specifically configured to receive the locating list sent by the location server.

The sending unit 620 is configured to send a locating broadcast message to user equipment, where the locating broadcast message carries the locating list.

The user equipment determines, according to the locating list, whether to receive a locating signal sent by the base station. Specifically, after receiving the locating list, the user equipment searches the locating list for the identifier of the user equipment; and if the locating list includes the identifier of the user equipment, receives the locating signal sent by the base station, and processes the locating signal to perform locating. If the locating list does not include the identifier of the user equipment, and the user equipment is secondary user equipment, a locating request may be sent to primary user equipment. If the primary user equipment permits the secondary user equipment to perform locating, the primary user equipment determines that the secondary user equipment is locatable user equipment, and sends a locating permission message to the secondary user equipment. When the secondary user equipment receives the locating permission message sent by the primary user equipment, the secondary user equipment receives the locating signal sent by the base station, and processes the locating signal to perform locating.

By means of the base station according to Embodiment 6 of the present invention, the base station sends a locating list to user equipment, whether the user equipment is locatable is determined according to the locating list, and only user equipment that is included in the locating list can receive a locating signal sent by the base station, to perform locating, which can effectively reduce power consumption of secondary user equipment, thereby reducing load of a locating system, and improving a processing capability of the locating system.

Figure 9:
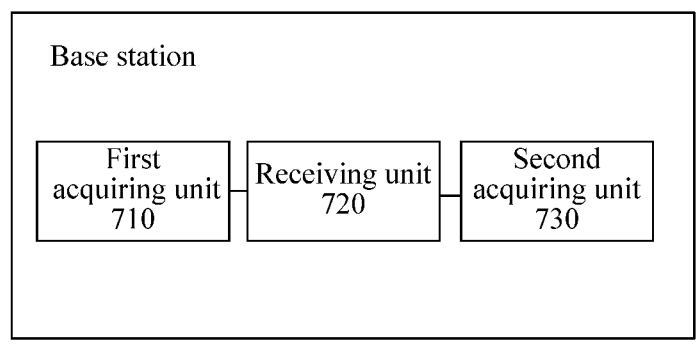
FIG. 9 is a schematic structural diagram of a base station according to Embodiment 7 of the present invention.

The following describes a base station in detail according to Embodiment 7 of the present invention by using FIG. 9 as an example. FIG. 9 is a schematic structural diagram of a base station according to Embodiment 7 of the present invention. The base station is used to implement the locating method according to Embodiment 3 of the present invention.

As shown in FIG. 9, the base station includes: a first acquiring unit 710, a receiving unit 720, and a second acquiring unit 730.

The first acquiring unit 710 is configured to acquire a locating list.

The locating list includes an identifier of locatable user equipment.

An identifier of user equipment may be specifically: an ID of the user equipment, an address of the user equipment, or the like.

Optionally, the locating list is created by the base station according to an identifier of primary user equipment, an identifier of secondary user equipment that is paired with the primary user equipment, and a locating enable identifier that are sent by the primary user equipment. The primary user equipment is user equipment that actively initiates a search and performs pairing, and the secondary user equipment is user equipment that is searched for and that is paired with the primary user equipment.

Therefore, the first acquiring unit 710 is configured to receive a locating configuration message sent by the primary user equipment, where the locating configuration message carries the identifier of the primary user equipment, the identifier of the secondary user equipment that is paired with the primary user equipment, and the locating enable identifier; the primary user equipment and each secondary user equipment separately correspond to one locating enable identifier, and the locating enable identifier is used to indicate whether user equipment is locatable. The first acquiring unit 710 creates the locating list according to the identifier of the primary user equipment, the identifier of secondary user equipment that is paired with the primary user equipment, and the locating enable identifier, where the locating list includes an identifier of user equipment corresponding to a locating enable identifier that indicates that the user equipment is locatable.

For example, when the locating enable identifier is 1, it indicates that the user equipment is locatable; or when the locating enable identifier is 0, it indicates that the user equipment is unlocatable. After receiving the locating configuration message, the first acquiring unit 710 acquires an identifier of user equipment corresponding to the locating enable identifier 1, and creates a locating list, where the locating list includes only the identifier of the user equipment corresponding to the locating enable identifier 1, that is, the identifier of the user equipment that the primary user equipment determines to be locatable.

Figure 10:
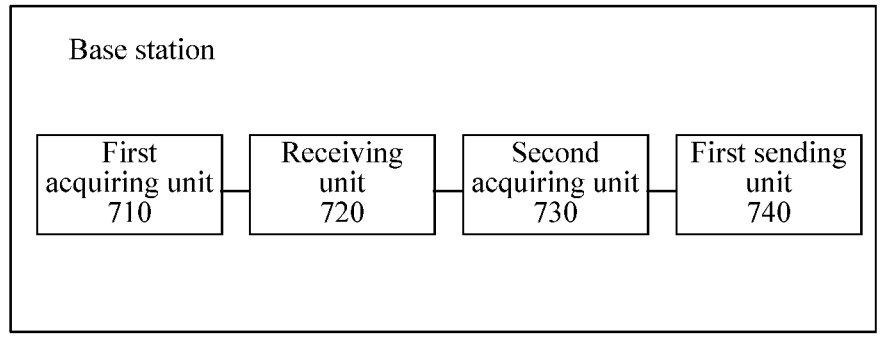
FIG. 10 is a schematic structural diagram of another base station according to Embodiment 7 of the present invention.

In addition, as shown in FIG. 10, the base station may further include: a first sending unit 740, configured to send the locating list to a location server, so that the location server sends the locating list to another base station in a base station group to which the base station belongs.

Optionally, the first acquiring unit is specifically configured to receive the locating list sent by the location server.

The receiving unit 720 is configured to receive a locating signal sent by user equipment.

The locating signal carries an identifier of the user equipment.

The second acquiring unit 730 is configured to: if the locating list does not include the identifier of the user equipment, ignore the locating signal sent by the user equipment.

If the locating list does not include the identifier of the user equipment, no processing is performed on the locating signal sent by the user equipment, thereby reducing load and power consumption of the base station.

The second acquiring unit 730 is further configured to: if the locating list includes the identifier of the user equipment, acquire locating information of the user equipment.

Optionally, the locating signal further carries the locating information. If the locating list includes the identifier of the user equipment, the second acquiring unit 730 acquires the locating information of the user equipment. The locating information specifically includes: information such as device description information (for example, a Bluetooth address and a device identifier), location coordinates, and floor information.

Optionally, the locating signal further carries first locating information. If the locating list includes the identifier of the user equipment, the second acquiring unit 730 acquires the first locating information of the user equipment from the locating signal, and acquires second locating information of the user equipment by using a multi-antenna array. The first locating information is specifically device description information (for example, a Bluetooth address and a device identifier). The second locating information is specifically an angle at which the user equipment receives a signal.

Figure 11:
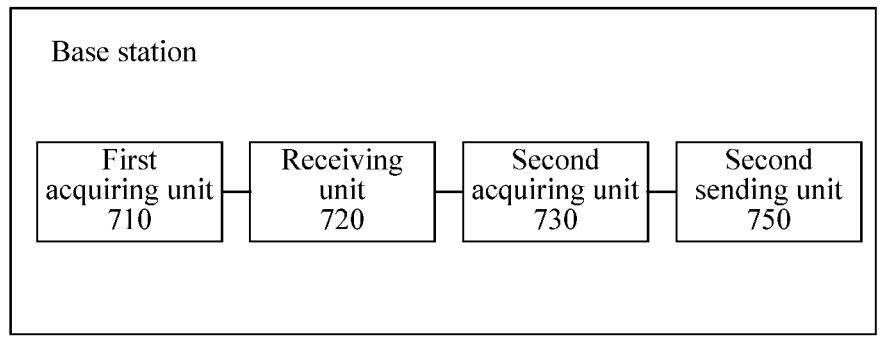
FIG. 11 is a schematic structural diagram of still another base station according to Embodiment 7 of the present invention.

As shown in FIG. 11, the base station may further include: a second sending unit 750, configured to send the locating information of the user equipment to the location server.

The location server calculates the location coordinates of the user equipment according to the locating information of the user equipment, and sends the location coordinates to the user equipment.

By means of the base station according to Embodiment 7 of the present invention, the base station locates only user equipment that is in a locating list, processes only a locating signal received from user equipment included in the locating list, and ignores a locating signal sent by user equipment that is not included in the locating list. The base station does not need to process received locating signals sent by all user equipments; therefore, load of a locating system can be effectively reduced, and a processing capability of the locating system can be effectively improved.

Figure 12:
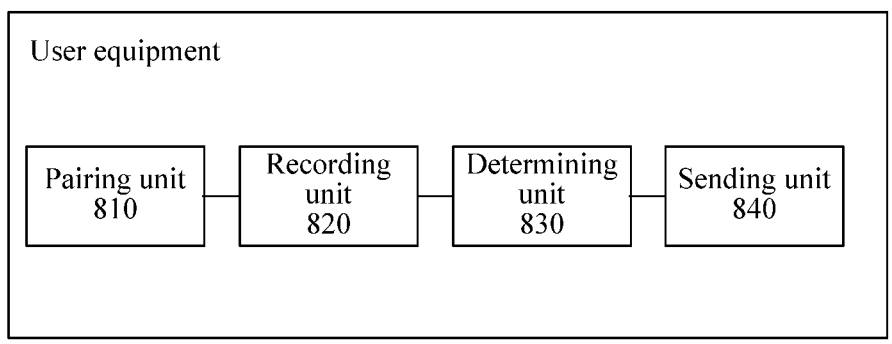
FIG. 12 is a schematic structural diagram of user equipment according to Embodiment 8 of the present invention.

The following describes user equipment in detail according to Embodiment 8 of the present invention by using FIG. 12 as an example. FIG. 12 is a schematic structural diagram of user equipment according to Embodiment 8 of the present invention. The user equipment is primary user equipment, and is used to implement the locating method according to Embodiment 4 of the present invention.

As shown in FIG. 12, the user equipment includes: a pairing unit 810, a recording unit 820, a determining unit 830, and a sending unit 840.

The pairing unit 810 is configured to perform pairing with secondary user equipment.

The primary user equipment is user equipment that actively initiates a search and performs pairing, and user equipment that is searched for and that is paired with the primary user equipment is the secondary user equipment.

The recording unit 820 is configured to record an identifier of the primary user equipment, and an identifier of the secondary user equipment that is paired with the primary user equipment.

An identifier of user equipment may be specifically: an ID of the user equipment, an address of the user equipment, or the like.

The determining unit 830 is configured to determine locatable user equipment in the primary user equipment and the secondary user equipment.

The determining unit 830 may determine, according to setting by a user, whether the primary user equipment needs to be located. If the user chooses to enable a locating function, the determining unit 830 determines that the primary user equipment is locatable user equipment. If the user chooses to prohibit the locating function from being enabled, the determining unit 830 determines that the primary user equipment is unlocatable user equipment.

The determining unit 830 may determine, according to a locating request of the secondary user equipment, whether the secondary user equipment is locatable. After receiving the locating request of the secondary user equipment, the primary user equipment prompts the user whether the secondary user equipment is permitted to be located. If the user chooses to permit the secondary user equipment to enable a locating function, the determining unit 830 determines that the secondary user equipment is locatable user equipment. If the user chooses to prohibit the secondary user equipment from enabling the locating function, the determining unit 830 determines that the secondary user equipment is unlocatable user equipment.

The sending unit 840 is configured to send a locating configuration message to a base station.

The locating configuration message carries the identifier of the primary user equipment, the identifier of the secondary user equipment that is paired with the primary user equipment, and a locating enable identifier; the primary user equipment and each secondary user equipment separately correspond to one locating enable identifier, and the locating enable identifier is used to indicate whether user equipment is locatable.

The base station creates a locating list according to the identifier of the primary user equipment, the identifier of the secondary user equipment that is paired with the primary user equipment, and the locating enable identifier, where the locating list includes an identifier of user equipment corresponding to a locating enable identifier that indicates that the user equipment is locatable.

For example, when the locating enable identifier is 1, it indicates that the user equipment is locatable; or when the locating enable identifier is 0, it indicates that the user equipment is unlocatable. After receiving the locating configuration message, the base station acquires an identifier of user equipment corresponding to the locating enable identifier 1, and creates a locating list, where the locating list includes only the identifier of the user equipment corresponding to the locating enable identifier 1, that is, the identifier of the user equipment that the primary user equipment determines to be locatable.

The sending unit 840 is further configured to send a locating signal to the base station, where the locating signal carries the identifier of the primary user equipment.

When receiving the locating signal sent by the primary user equipment, the base station acquires the identifier of the primary user equipment from the locating signal, and then performs matching in the locating list. If the locating list does not include the identifier of the primary user equipment, ignore the locating signal sent by the primary user equipment. If the locating list includes the identifier of the primary user equipment, the base station acquires locating information of the primary user equipment, and sends the locating information of the primary user equipment to a location server.

Figure 13:
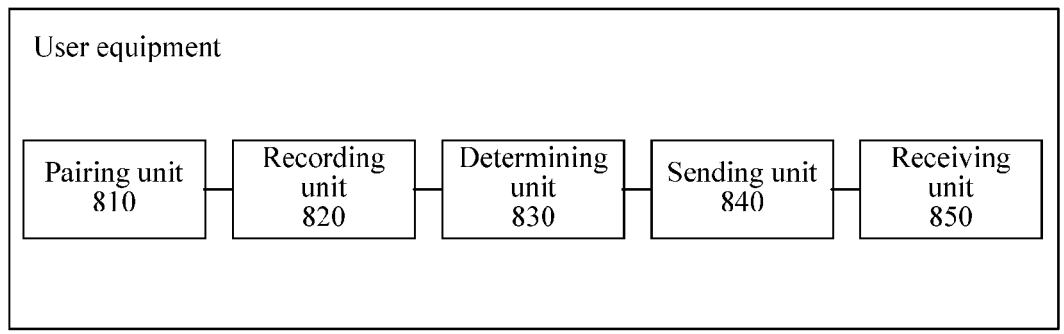
FIG. 13 is a schematic structural diagram of another user equipment according to Embodiment 8 of the present invention.

In addition, as shown in FIG. 13, the user equipment may further include: a receiving unit 850.

The receiving unit 850 is configured to receive a locating response message sent by the location server.

After receiving the locating information of the primary user equipment that is sent by the base station, the location server sends a locating response message to the primary user equipment, to notify the primary user equipment that the location server already begins to perform locating for the primary user equipment.

Accordingly, the sending unit 840 is further configured to send, according to the locating response message, configuration information to unlocatable secondary user equipment in the secondary user equipment that matches the primary user equipment.

The configuration information is used to instruct the secondary user equipment to reduce signal transmit power.

The base station processes only a locating signal from user equipment that is included in the locating list, and signal transmit power of unlocatable secondary user equipment only needs to meet that the primary user equipment can receive a signal; therefore, the sending unit 840 sends configuration information to the unlocatable secondary user equipment, to instruct the unlocatable secondary user equipment to reduce the signal transmit power, thereby reducing power consumption of the secondary user equipment.

By means of the user equipment according to Embodiment 8 of the present invention, primary user equipment notifies a base station of locatable user equipment, so that the base station processes only a locating signal from the locatable user equipment, and does not need to process received locating signals sent by all user equipments. In addition, after receiving a locating response message sent by a location server, the primary user equipment sends a configuration message to unlocatable secondary user equipment to instruct the secondary user equipment to reduce signal transmit power, which can effectively reduce power consumption of the secondary user equipment; therefore, load of a locating system can be effectively reduced, and a processing capability of the locating system can be effectively improved.

Figure 14:
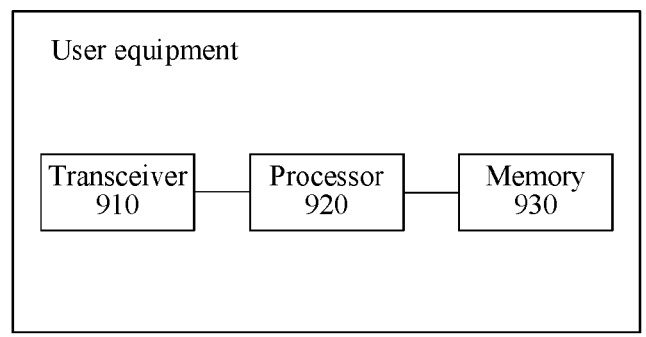
FIG. 14 is a schematic structural diagram of user equipment according to Embodiment 9 of the present invention.

The following describes user equipment in detail according to Embodiment 9 of the present invention by using FIG. 14 as an example. FIG. 14 is a schematic structural diagram of user equipment according to Embodiment 9 of the present invention. The user equipment is used to implement the locating method according to Embodiment 1 of the present invention.

As shown in FIG. 14, the user equipment includes: a transceiver 910, a processor 920, and a memory 930.

The transceiver 910 is configured to receive a locating broadcast message sent by a base station, where the locating broadcast message carries a locating list, and the locating list includes an identifier of locatable user equipment.

The transceiver 910 is further configured to: if the locating list does not include an identifier of the user equipment, ignore a locating signal sent by the base station.

Further, the user equipment is primary user equipment. The processor 920 is configured to perform pairing with secondary user equipment, record an identifier of the primary user equipment and an identifier of the secondary user equipment, and determine locatable user equipment in the primary user equipment and the secondary user equipment. The transceiver 910 is further configured to send a locating configuration message to the base station, where the locating configuration message carries the identifier of the primary user equipment, the identifier of the secondary user equipment, and a locating enable identifier; the primary user equipment and each secondary user equipment separately correspond to one locating enable identifier, and the locating enable identifier is used to indicate whether user equipment is locatable, so that the base station creates the locating list, where the locating list includes an identifier of user equipment corresponding to a locating enable identifier that indicates that the user equipment is locatable.

Further, the user equipment is primary user equipment. The transceiver 910 is further configured to receive a locating request sent by the secondary user equipment. The transceiver 910 is further configured to: if it is determined that the secondary user equipment is locatable secondary user equipment, send a locating permission message to the secondary user equipment, so that the secondary user equipment receives the locating signal sent by the base station, and performs locating according to the locating signal.

Further, the user equipment is secondary user equipment. The transceiver 910 is further configured to send a locating request to primary user equipment. The transceiver 910 is further configured to: when receiving a locating permission message sent by the primary user equipment, receive, by the secondary user equipment, the locating signal sent by the base station. The processor 920 is configured to perform locating according to the locating signal.

Further, the transceiver 910 is further configured to: if the locating list includes the identifier of the user equipment, receive the locating signal sent by the base station. The processor 920 is configured to perform locating according to the locating signal.

By means of the user equipment according to Embodiment 9 of the present invention, whether the user equipment is locatable is determined according to a locating list, and user equipment that is not included in the locating list ignores a locating signal sent by a base station, and does not need to be located. Therefore, power consumption of secondary user equipment can be effectively reduced, thereby reducing load of a locating system, and improving a processing capability of the locating system.

Figure 15:
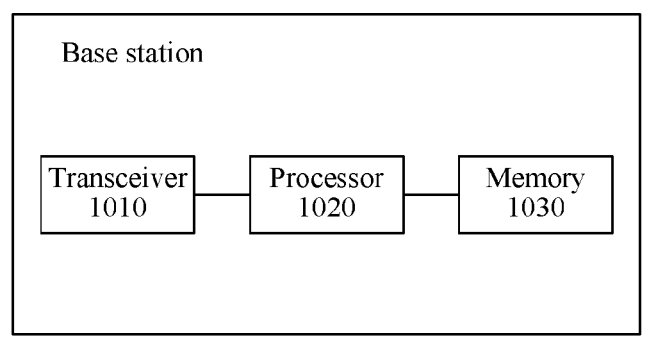
FIG. 15 is a schematic structural diagram of a base station according to Embodiment 10 of the present invention.

The following describes a base station in detail according to Embodiment 10 of the present invention by using FIG. 15 as an example. FIG. 15 is a schematic structural diagram of a base station according to Embodiment 10 of the present invention. The base station is used to implement the locating method according to Embodiment 2 of the present invention.

As shown in FIG. 15, the base station includes: a transceiver 1010, a processor 1020, and a memory 1030.

The processor 1020 is configured to acquire a locating list, where the locating list includes an identifier of locatable user equipment.

The transceiver 1010 is configured to send a locating broadcast message to user equipment, where the locating broadcast message carries the locating list, so that the user equipment determines, according to the locating list, whether to receive a locating signal sent by the base station.

Further, the processor 1020 is specifically configured to receive, by using the transceiver 1010, a locating configuration message sent by primary user equipment, where the locating configuration message carries an identifier of the primary user equipment, an identifier of secondary user equipment that is paired with the primary user equipment, and a locating enable identifier; the primary user equipment and each secondary user equipment separately correspond to one locating enable identifier, and the locating enable identifier is used to indicate whether user equipment is locatable; and create the locating list according to the locating configuration message, where the locating list includes an identifier of user equipment corresponding to a locating enable identifier that indicates that the user equipment is locatable.

Further, the transceiver 1010 is further configured to send the locating list to a location server, so that the location server sends the locating list to another base station in a base station group to which the base station belongs.

Further, the processor 1020 is specifically configured to receive, by using the transceiver 1010, the locating list sent by the location server.

By means of the base station according to Embodiment 10 of the present invention, the base station sends a locating list to user equipment, whether the user equipment is locatable is determined according to the locating list, and only user equipment that is included in the locating list can receive a locating signal sent by the base station, to perform locating, which can effectively reduce power consumption of secondary user equipment, thereby reducing load of a locating system, and improving a processing capability of the locating system.

Figure 16:
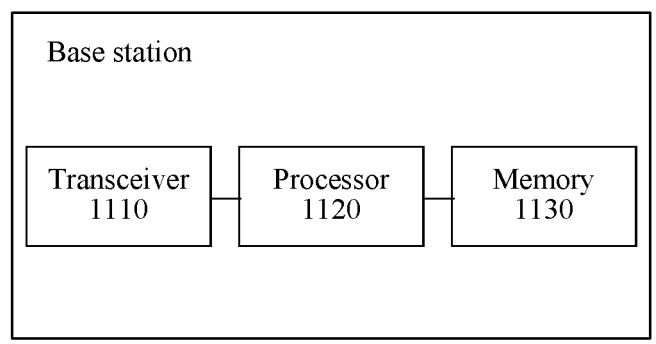
FIG. 16 is a schematic structural diagram of a base station according to Embodiment 11 of the present invention.

The following describes a base station in detail according to Embodiment 11 of the present invention by using FIG. 16 as an example. FIG. 16 is a schematic structural diagram of a base station according to Embodiment 11 of the present invention. The base station is used to implement the locating method according to Embodiment 3 of the present invention.

As shown in FIG. 16, the base station includes: a communications interface 1110, a processor 1120, and a memory 1130.

The processor 1120 is configured to acquire a locating list, where the locating list includes an identifier of locatable user equipment.

The transceiver 1110 is configured to receive a locating signal sent by user equipment, where the locating signal carries an identifier of the user equipment.

The processor 1120 is further configured to: if the locating list does not include the identifier of the user equipment, ignore the locating signal.

Further, the user equipment is primary user equipment, and the processor 1120 is specifically configured to receive, by using the transceiver 1110, a locating configuration message sent by the primary user equipment, where the locating configuration message carries an identifier of the primary user equipment, an identifier of secondary user equipment that is paired with the primary user equipment, and a locating enable identifier; the primary user equipment and each secondary user equipment separately correspond to one locating enable identifier, and the locating enable identifier is used to indicate whether user equipment is locatable; and create the locating list according to the locating configuration message, where the locating list includes an identifier of user equipment corresponding to a locating enable identifier that indicates that the user equipment is locatable.

Further, the transceiver 1110 is further configured to send the locating list to the location server, so that the location server sends the locating list to another base station in a base station group to which the base station belongs.

Further, the processor 1120 is specifically configured to receive, by using the transceiver 1110, the locating list sent by the location server.

Further, the processor 1120 is further configured to: if the locating list includes the identifier of the user equipment, acquire, by the base station, locating information of the user equipment. The transceiver 1110 is further configured to send the locating information of the user equipment to the location server, so that the location server performs locating according to the locating information of the user equipment.

By means of the base station according to Embodiment 11 of the present invention, the base station locates only user equipment that is in a locating list, processes only a locating signal received from user equipment included in the locating list, and ignores a locating signal sent by user equipment that is not included in the locating list. The base station does not need to process received locating signals sent by all user equipments; therefore, load of a locating system can be effectively reduced, and a processing capability of the locating system can be effectively improved.

Figure 17:
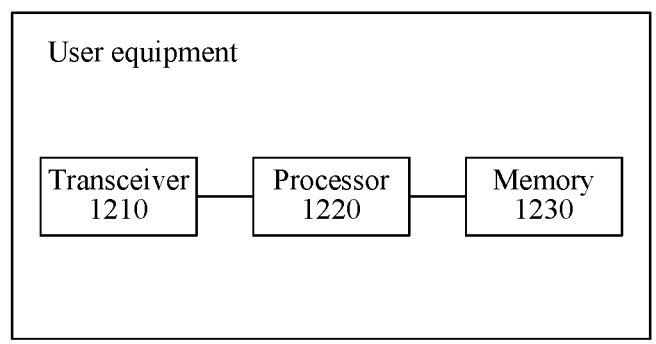
FIG. 17 is a schematic structural diagram of user equipment according to Embodiment 12 of the present invention.

The following describes user equipment in detail according to Embodiment 12 of the present invention by using FIG. 17 as an example. FIG. 17 is a schematic structural diagram of user equipment according to Embodiment 12 of the present invention. The user equipment is primary user equipment, and is used to implement the locating method according to Embodiment 4 of the present invention.

As shown in FIG. 17, the user equipment includes: a communications interface 1210, a processor 1220, and a memory 1230.

The processor 1220 is configured to perform pairing with secondary user equipment, record an identifier of the primary user equipment and an identifier of the secondary user equipment, and determine locatable user equipment in the primary user equipment and the secondary user equipment.

The transceiver 1210 is configured to send a locating configuration message to a base station, where the locating configuration message carries the identifier of the primary user equipment, the identifier of the secondary user equipment, and a locating enable identifier; the primary user equipment and each secondary user equipment separately correspond to one locating enable identifier, and the locating enable identifier is used to indicate whether user equipment is locatable, so that the base station creates the locating list, where the locating list includes an identifier of user equipment corresponding to a locating enable identifier that indicates that the user equipment is locatable.

The transceiver 1210 is further configured to send a locating signal to the base station, where the locating signal carries the identifier of the primary user equipment, so that when the locating list in the base station does not include the identifier of the primary user equipment, the base station ignores the locating signal.

Further, the transceiver 1210 is further configured to receive a locating response message sent by the location server. The transceiver 1210 is further configured to send configuration information to unlocatable secondary user equipment in the secondary user equipment according to the locating response message, where the configuration information is used to instruct the unlocatable secondary user equipment to reduce signal transmit power.

By means of the user equipment according to Embodiment 12 of the present invention, primary user equipment notifies a base station of locatable user equipment, so that the base station processes only a locating signal from the locatable user equipment, and does not need to process received locating signals sent by all user equipments. In addition, after receiving a locating response message sent by a location server, the primary user equipment sends a configuration message to unlocatable secondary user equipment to instruct the secondary user equipment to reduce signal transmit power, which can effectively reduce power consumption of the secondary user equipment; therefore, load of a locating system can be effectively reduced, and a processing capability of the locating system can be effectively improved.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

Steps of methods or algorithms described in the embodiments disclosed in this specification may be implemented by hardware, a software module executed by a processor, or a combination thereof. The software module may reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

In the foregoing specific implementation manners, the objective, technical solutions, and benefits of the present invention are further described in detail. It should be understood that the foregoing descriptions are merely specific implementation manners of the present invention, but are not intended to limit the protection scope of the present invention. Any modification, equivalent replacement, or improvement made without departing from the spirit and principle of the present invention should fall within the protection scope of the present invention.

What is claimed is:

1. A method, comprising:
   receiving, by a terminal device, a locating broadcast message sent by a base station, wherein the locating broadcast message carries a locating list, and the locating list comprises an identifier of a locatable terminal device; and
   when the locating list does not comprise an identifier of the terminal device, ignoring, by the terminal device, a locating signal sent by the base station.

2. The method according to claim 1, wherein the terminal device is primary terminal device, and before receiving, by the terminal device, the locating broadcast message sent by a base station, the method further comprises:
   performing, by the terminal device, pairing with a secondary terminal device;
   recording, by the primary terminal device, an identifier of the primary terminal device and an identifier of the secondary terminal device;
   determining, by the primary terminal device, a locatable terminal device in the primary terminal device and the secondary terminal device; and
   sending, by the primary terminal device, a locating configuration message to the base station, wherein the locating configuration message carries the identifier of the primary terminal device, the identifier of the secondary terminal device, and a locating enable identifier; wherein the primary terminal device and the secondary terminal device separately correspond to one locating enable identifier, and the locating enable identifier indicates whether terminal device is locatable, so that the base station creates the locating list, wherein the locating list comprises an identifier of terminal device corresponding to the locating enable identifier that indicates that the terminal device is locatable.

3. The method according to claim 2, wherein after receiving the locating broadcast message sent by a base station, the method further comprises:
   when the locating list comprises the identifier of the terminal device, receiving, by the terminal device, a locating signal sent by the base station; and
   performing, by the terminal device, locating according to the locating signal.

4. The method according to claim 1, wherein the terminal device is a primary terminal device, and after receiving, by the terminal device, the locating broadcast message sent by the base station, the method further comprises:
   receiving, by the primary terminal device, a locating request sent by the secondary terminal device; and
   when it is determined that the secondary terminal device is a locatable secondary terminal device, sending, by the primary terminal device, a locating permission message to the secondary terminal device, so that the secondary terminal device receives the locating signal sent by the base station, and performs locating according to the locating signal.

5. The method according to claim 4, wherein after receiving, by the terminal device, the locating broadcast message sent by a base station, the method further comprises:
   when the locating list comprises the identifier of the terminal device, receiving, by the terminal device, a locating signal sent by the base station; and
   performing, by the terminal device, locating according to the locating signal.

6. The method according to claim 1, wherein the terminal device is secondary terminal device, and after ignoring, by the terminal device, the locating signal sent by the base station, the method further comprises:
   sending, by the secondary terminal device, a locating request to a primary terminal device;
   when receiving a locating permission message sent by the primary terminal device, receiving, by the secondary terminal device, a locating signal sent by the base station; and
   performing, by the secondary terminal device, locating according to the locating signal.

7. The method according to claim 1, wherein after receiving, by the terminal device, the locating broadcast message sent by the base station, the method further comprises:
   when the locating list comprises the identifier of the terminal device, receiving, by the terminal device, a locating signal sent by the base station; and
   performing, by the terminal device, locating according to the locating signal.

8. A method, comprising:
   acquiring, by a base station, a locating list, wherein the locating list comprises an identifier of a locatable terminal device;
   receiving, by the base station, a locating signal sent by a terminal device, wherein the locating signal carries an identifier of the terminal device; and when the locating list does not comprise the identifier of the terminal device, ignoring, by the base station, the locating signal.

9. The method according to claim 8, wherein the terminal device is a primary terminal device, and acquiring, by the base station, the locating list comprises:
receiving, by the base station, a locating configuration message sent by the primary terminal device, wherein the locating configuration message carries an identifier of the primary terminal device, an identifier of a secondary terminal device that is paired with the primary terminal device, and a locating enable identifier, wherein the primary terminal device and the secondary terminal device separately correspond to one locating enable identifier, and the locating enable identifier indicates whether the primary terminal device is locatable; and
creating, by the base station, the locating list according to the locating configuration message, wherein the locating list comprises an identifier of user equipment corresponding to a locating enable identifier that indicates that the primary terminal device is locatable.

10. The method according to claim 9, wherein after acquiring, by the base station, the locating list, the method further comprises:
sending, by the base station, the locating list to a location server, so that the location server sends the locating list to another base station in a base station group to which the base station belongs.

11. The method according to claim 8, wherein acquiring, by the base station, the locating list comprises:
receiving, by the base station, the locating list sent by a location server.

12. The method according to claim 8, wherein after receiving, by the base station, the locating signal sent by the terminal device, the method further comprises:
when the locating list comprises the identifier of the terminal device, acquiring, by the base station, locating information of the terminal device; and
sending, by the base station, the locating information of the terminal device to a location server, so that the location server performs locating according to the locating information of the terminal device.

13. A terminal device, comprising:
a processor;
a transceiver; and
a non-transitory memory;
wherein the transceiver is configured to:
receive a locating broadcast message sent by a base station, wherein the locating broadcast message carries a locating list, and the locating list comprises an identifier of a locatable terminal device; and
when the locating list does not comprise an identifier of the terminal device, ignore a locating signal sent by the base station.

14. The terminal device according to claim 13, wherein the terminal device is primary terminal device;
wherein the processor is configured to perform pairing with a secondary terminal device, record an identifier of the primary terminal device and an identifier of the secondary terminal device, and determine a locatable terminal device in the primary terminal device and the secondary terminal device; and wherein the transceiver is further configured to send a locating configuration message to the base station, wherein the locating configuration message carries the identifier of the primary terminal device, the identifier of the secondary terminal device, and a locating enable identifier; and
wherein the primary terminal device and the secondary terminal device separately correspond to one locating enable identifier, and the locating enable identifier indicates whether the primary terminal device is locatable, so that the base station creates the locating list, wherein the locating list comprises an identifier of terminal device corresponding to a locating enable identifier that indicates that the primary terminal device is locatable.

15. The terminal device according to claim 14, wherein the transceiver is further configured to, when the locating list comprises the identifier of the terminal device, receive the locating signal sent by the base station; and
wherein the processor is configured to perform locating according to the locating signal.

16. The terminal device according to claim 14, wherein the terminal device is a primary terminal device;
wherein the transceiver is further configured to receive a locating request sent by the secondary terminal device; and
wherein the transceiver is further configured to, when it is determined that the secondary terminal device is a locatable secondary terminal device, send a locating permission message to the secondary terminal device, so that the secondary terminal device receives the locating signal sent by the base station, and performs locating according to the locating signal.

17. The terminal device according to claim 16, wherein the transceiver is further configured to, when the locating list comprises the identifier of the terminal device, receive the locating signal sent by the base station; and
wherein the processor is configured to perform locating according to the locating signal.

18. The terminal device according to claim 13, wherein the terminal device is a secondary terminal device;
wherein the transceiver is further configured to send a locating request to a primary terminal device;
wherein the transceiver is further configured to, when receiving a locating permission message sent by the primary terminal device, receive the locating signal sent by the base station; and
wherein the processor is configured to perform locating according to the locating signal.

19. The terminal device according to claim 18, wherein the transceiver is further configured to, when the locating list comprises the identifier of the terminal device, receive the locating signal sent by the base station; and
wherein the processor is configured to perform locating according to the locating signal.

20. The terminal device according to claim 13, wherein the transceiver is further configured to, when the locating list comprises the identifier of the terminal device, receive the locating signal sent by the base station; and
wherein the processor is configured to perform locating according to the locating signal.

* * * * *